(12) United States Patent
Chen et al.

(10) Patent No.: US 12,011,795 B2
(45) Date of Patent: Jun. 18, 2024

(54) AUTOMATIC TOOL SETTING SYSTEM AND METHOD BASED ON SPECTRAL CONFOCAL DISPLACEMENT SENSOR

(71) Applicants: SHANGHAI JIAO TONG UNIVERISTY, Shanghai (CN); SHANGHAI INSTITUTE OF AEROSPACE CONTROL TECHNOLOGY, Shanghai (CN)

(72) Inventors: Ming Chen, Shanghai (CN); Qinglong An, Shanghai (CN); Weiwei Ming, Shanghai (CN); Xiaojiang Cai, Shanghai (CN); Ruhao Zhou, Shanghai (CN); Xianghui Huang, Shanghai (CN)

(73) Assignees: SHANGHAI JIAO TONG UNIVERISTY, Shanghai (CN); SHANGHAI INSTITUTE OF AEROSPACE CONTROL TECHNOLOGY, Shanghai (CN)

(*) Notice: Subject to any disclaimer, the term of this patent is extended or adjusted under 35 U.S.C. 154(b) by 535 days.

(21) Appl. No.: 17/305,323

(22) Filed: Jul. 5, 2021

(65) Prior Publication Data
US 2022/0048151 A1 Feb. 17, 2022

Related U.S. Application Data

(63) Continuation-in-part of application No. PCT/CN2020/117620, filed on Sep. 25, 2020.

(51) Int. Cl.
*B23Q 17/22* (2006.01)
*B23Q 15/24* (2006.01)
*B23Q 17/24* (2006.01)

(52) U.S. Cl.
CPC ......... *B23Q 17/2266* (2013.01); *B23Q 15/24* (2013.01); *B23Q 17/2428* (2013.01); *B23Q 2717/003* (2013.01)

(58) Field of Classification Search
CPC .... B23Q 15/24; B23Q 15/22; B23Q 17/2428; B23Q 17/24; B23Q 17/2266; B23Q 17/22;
(Continued)

(56) References Cited

U.S. PATENT DOCUMENTS

2002/0145398 A1* 10/2002 Knorr .................. B23Q 15/24
318/560

FOREIGN PATENT DOCUMENTS

CN 104070183 A * 10/2014 ............... B23B 5/06

* cited by examiner

*Primary Examiner* — Sunil K Singh
*Assistant Examiner* — Eric Daniel Whitmire
(74) *Attorney, Agent, or Firm* — CBM PATENT CONSULTING, LLC

(57) ABSTRACT

The invention discloses an automatic tool aligning system based on a spectral confocal displacement sensor. The system comprises three-dimensional mobile platform, tool aligning component based on the spectral confocal displacement sensor, clamping device, machine tool and the control module. The three-dimensional mobile platform is fixed on the outer side of the machine tool, the tool aligning component is connected with the three-dimensional mobile platform, the clamping device used to clamp the workpiece is fixed on the center of the machine tool through mechanical connection, and the spectral confocal displacement sensor is connected with the control module. After judging the collected working condition data, the control module outputs a control instruction to the three-dimensional mobile platform.

5 Claims, 3 Drawing Sheets

(58) Field of Classification Search
CPC .............. B23Q 2717/003; B23B 25/06; B23B 2260/092; B23B 2270/48
See application file for complete search history.

AUTOMATIC TOOL SETTING SYSTEM AND METHOD BASED ON SPECTRAL CONFOCAL DISPLACEMENT SENSOR

CROSS REFERENCES

This application is the continuation-in-part of application of International Application No. PCT/CN2020/117620 filed on 25 Sep. 2020 which designated the U.S. and claims priority to Chinese Application No. CN202010817042.X filed on 14 Aug. 2020, the entire contents of each of which are hereby incorporated by reference.

TECHNICAL FIELD

The present invention relates to the technology of manufacturing field, in particular to the automatic tool aligning system and method based on a spectral confocal displacement sensor.

BACKGROUND OF THE INVENTION

The servo valve is the core hydraulic control part of the serv executive system, which converts the electrical input signal and amplifies it into controlled high-power hydraulic energy to drive the executive component.

However, the overlap of the servo valve is limited by the functional edge integrity. Excessively blunt edge, residual burr and deficient tread will affect the performance of the servo valve which will affect the accuracy of the guided missile/rocket attitude control. Currently, there are two processes involved in edge machining. One is to use an external grinding machine for grinding, followed by the manual polishing in the final lamination test, which has low efficiency and a rejection rate of up to 50%. Another method is to build special equipment on the grinding machine to remove the micro-burr.

In the prior technology, a manual method is adopted to arrange the tool setting. This method is not only complicated in procedure, but also has a higher requirement for operating technology, which needs continuous debugging to achieve the accuracy of tool setting. The error of the cutting edge, the cylindrical generatrix and the axis alignment in the machining process of the valve core of the spaceflight servo valve often cause the errors in the feed, the large feed can lead to the scrap of the workpiece, and the small feed is insufficient in removing burr. The process currently lacks a set of method for realizing the automatic rapid precise tool alignment.

SUMMARY OF THE INVENTION

Aiming to solve the problems associated with the prior technology, the invention provides an automatic tool aligning system and method based on the spectral confocal displacement sensor. The system has the advantages of structural modularization, high reconfigurability, no need of manual assistance, and high precision. Besides, it can greatly reduce the manufacturing auxiliary process time, save the manufacturing cost, and can improve the manufacturing precision.

The present invention is achieved by the following technical schemes:

The present invention relates to an automatic tool aligning system based on a spectral confocal displacement sensor, including the workpiece clamping device, machine tool and control module. The three-dimensional moving platform is fixedly on the outer side of the machine tool and is connected with the three-dimensional moving platform; the clamping device used to clamp the workpiece is fixed between the fixing tip and the moving tip of the grinding machine tool through a mechanical connection and the spectrum confocal displacement sensor is connected with the control module. After judging the collected working condition data, the control module outputs a control instruction to the three-dimensional moving platform.

The three-dimensional mobile platform includes: three moving modules which are perpendicular to each other, a corresponding base and the first adapter plate. The X-axis motion module base is fixedly on the outer side of the machine tool; the X-axis motion module is connected with the X-axis motion module base; the Y-axis motion module base is connected with the X-axis motion module; the Y-axis motion module base is connected with the Y-axis motion module base; the Z-axis motion module base is fixedly on the Y-axis motion module through the first adapter plate;

The three motion modules each comprise a linear motor, a grating ruler and a track. The linear motor is connected with the control module and receives the control instruction to drive the crawler to move. The grating ruler senses the motion position and feeds back the calibration information to the control module The tool aligning component includes: diamond turning tool, spectral confocal displacement sensor, the second adapter plate, the fixing cover for spectral confocal displacement sensor, a spectral confocal displacement sensor, and tool supporting seat. In the tool aligning component, the second adapter plate is connected with the Z-axis motion module. The spectral confocal displacement sensor and the tool supporting seat are connected with the second adapter plate. The fixing cover of the spectral confocal displacement sensor is connected with the spectral confocal displacement sensor and the tool supporting seat, respectively. The diamond turning tool is connected with the spectral confocal displacement sensor and the turning tool supporting seat, respectively.

The axis of the spectral confocal displacement sensor is in the same plane with the diamond cutting edge and the error is within 0.1 mm.

The clamping device includes: the fixed tip of machine tool, moving tip of machine tool, a rotary limiting block, a clamping ring and a workpiece to be machined. The rotary limiting block is fixed on the grinding machine through a screw. The workpiece is fixed between the fixed tip and the moving tip of the machine tool. The clamping ring is clamped on the cylindrical workpiece through the screw, and the handle extending from the clamping ring is in contact with the rotary limiting block. When the machine tool rotates, the clamping ring is driven by the limiting block to rotate, and then the workpiece is driven to rotate.

The control module comprises a displacement data reading unit, a state decision unit and a motion execution unit. The displacement data reading unit is connected with the state decision unit and the pose data from the spectral displacement sensor is transmitted to the state decision unit. The state decision unit is connected with the motion execution unit, and the acquired pose information is judged and sent to the three-axis motion platform.

Technical Effect

The invention integrally solves the shortcomings that the existing motion platform depends on manual completion, the procedure is tedious, and the high precision requires rich operation experience. According to the invention, the linear motion module is driven by the feedback of the spectrum confocal displacement sensor and the automatic control motion platform, the operation requirement is low, and the consumption time is short. The mechanical manufacturing auxiliary process time is reduced and the manufacturing positioning precision is improved. In addition, standardized components facilitate the assembly and replacement.

DETAILED DESCRIPTION OF THE PREFERRED EMBODIMENTS

Figure 1:
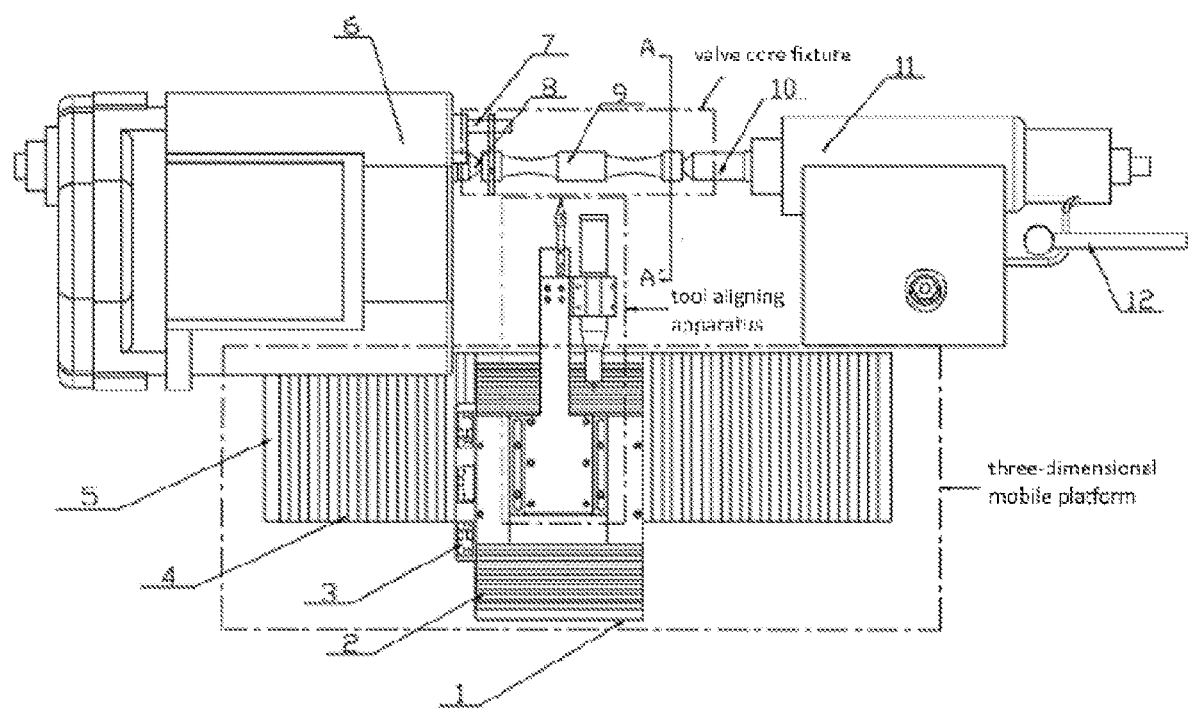
FIG. 1 is the top view of the automatic tool aligning device based on a spectral confocal sensor.
Figure 2:
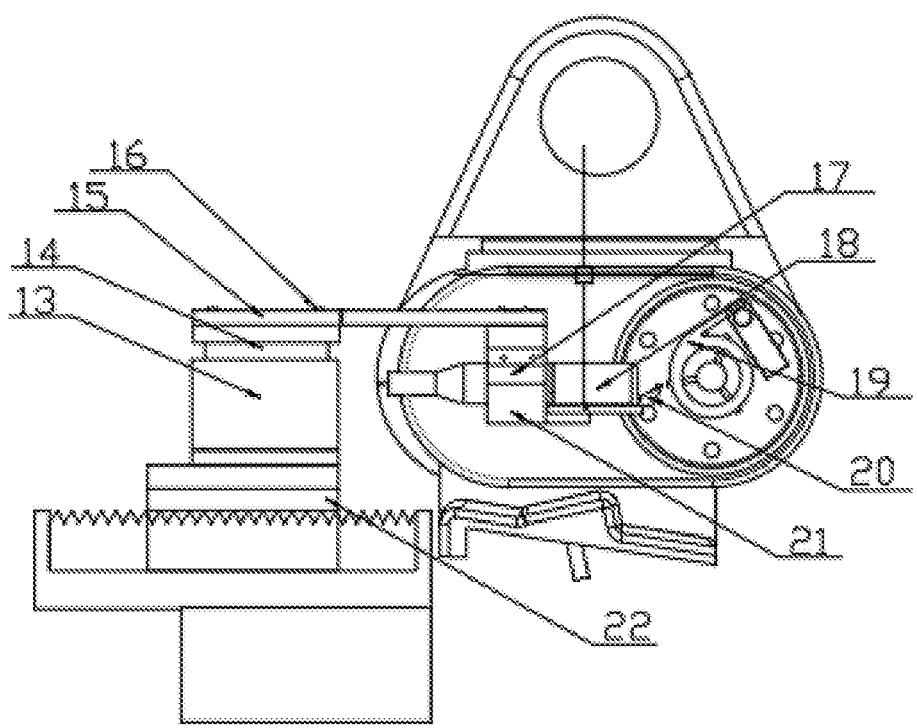
FIG. 2 is the block diagram of the automatic tool aligning device based on a spectral confocal sensor from A-A' cross section.

As shown in FIGS. 1 and 2, this case relates to a spectral displacement sensor-based automatic tool aligning device for turning the burr of servo valve core edge with high precision requirements. This device includes the base of Y-axis motion module 1, Y-axis motion module 2, grating scale 3, X-axis motion module 4, the base of X-axis motion module 5, the base of machine tool fixed tip 6, a rotary limiting block 7, the machine tool fixed tip 8, the workpiece to be machined 9, the machine tool moving tip 10, the base of machine tool moving tip 11, the control handle of movable tip 12, the base of Z-axis motion module 13, the Z-axis motion module 14, the second adapter plate 15, the bolt 16, the clamping cover of spectral confocal displacement sensor 17, the spectral confocal displacement sensor 18, the clamping ring 19, the diamond turning tool 20, the supporting seat of spectral confocal displacement sensor and turning tool 21, the first adapter plate 22.

The device is assembled in the following process. The base of X-axis motion model 5 is fixed on the machine tool body through bolts 16, the X-axis moving module 4 is fixed on the base of X-axis motion module 5, the base of Y-axis moving 1 is fixedly arranged on the X-axis moving module 4 by screws, the Y-axis motion module 2 is fixedly arranged on the base of Y-axis motion module 1, the base of Z-axis operation module 13 is fixedly arranged on the first adapter plate 22, the Z-axis motion module 14 is fixedly arranged on the base of Z-axis motion module 13, the second adapter plate 15 is fixedly arranged on the Z-axis motion module 14 by screws, and the support seat of spectral confocal displacement sensor and the turning tool 21 are fixedly arranged on the second adapter plate 15 through bolts. The diamond turning tool 20 is fixedly disposed on the supporting seat of spectral confocal displacement sensor and the turning tool 21, the spectral confocal displacement sensor 18 is placed on the supporting seat of spectral confocal displacement sensor and the turning tool 21, the fixing cover of spectral confocal sensor 17 fixes the spectral confocal displacement sensor 18 on the supporting seat of spectral confocal displacement sensor and the turning tool 21, the clamping ring 19 is clamped on the workpiece 9, the workpiece 9 is placed on the machine tool fixed tip 8 of the machine tool, the control handle of movable tip 12 rotate, and the machine tool moving tip 10 then move to the right to realize the clamping of the workpiece. The clamping ring 19 is placed on the rotating limit block 7, and the spectral confocal displacement sensor 18, X motion module, Y motion module and Z motion module are connected with the industrial computer.

Figure 3:
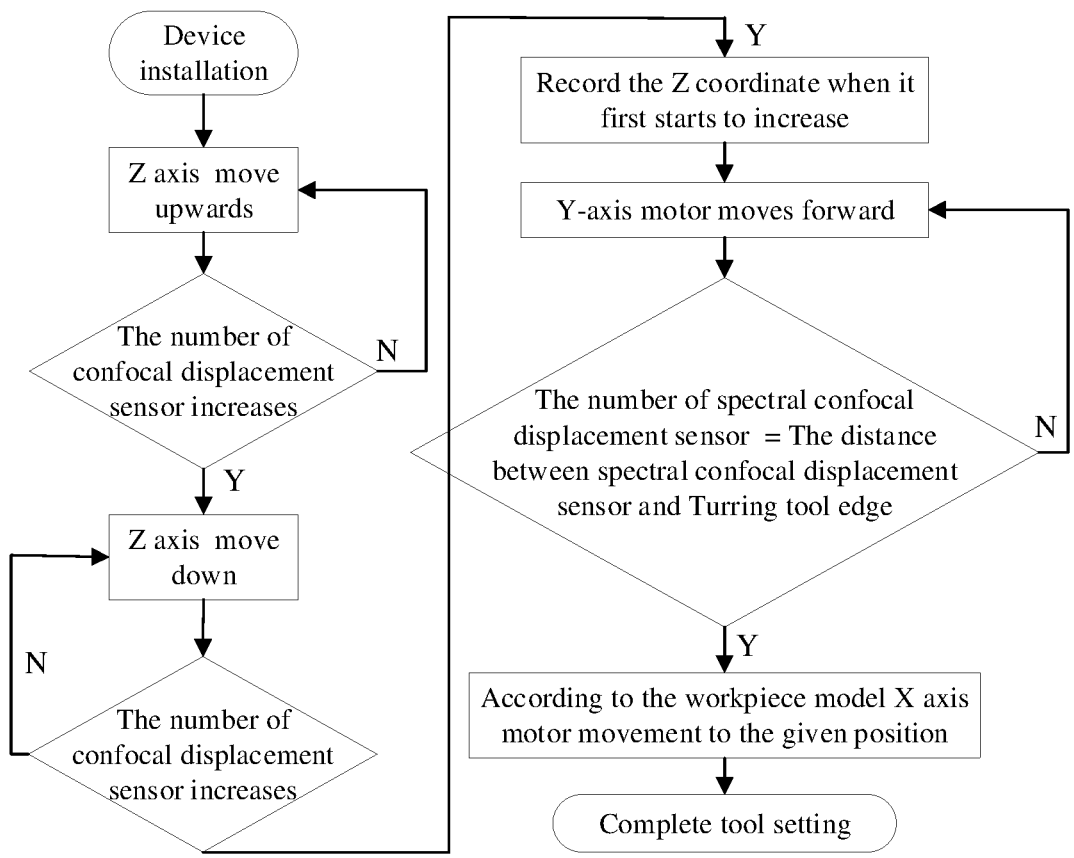
FIG. 3 is the schematic diagram of a control flow of an automatic tool aligning device.

The specific working process of the device is as follows. After the valve core is fixed on the outer circle grinding machine, the three-axis moving platform automatically returns to the zero position if the corresponding valve core model is pressed down. Then, the X axis moves forwards to the cylindrical surface of the valve core, and the Y axis moves forwards to the position where the spectral confocal displacement sensor can work (i.e. the focusing process is completed). After that, the Z-axis motion platform moves upward. If the number obtained from the confocal displacement sensor increases, you should move downward and the number of confocal displacement sensor reading will accordingly decrease. Once the number increases again, it means the Z-axis center high is in the proper position. The movement of Z-axis must be stopped immediately. The Y-axis motion module moves forward and it should be stopped when the confocal sensor reading is equal to the distance between the spectral confocal displacement sensor and the cutting edge. The X-axis motion module will move to the specified position according to the workpiece model to complete the tool alignment. The corresponding flow is shown in FIG. 3.

According to the test result of the present case, the original tool aligning process for a skillful operator requires four minutes to achieve the micron-level tool precision. While even if a primary operator uses our device, the tool aligning operation can be completed at 20 seconds. Meanwhile, the precision is improved by 10 times, the speed is increased by 12 times, and the requirement for operators is reduced.

Compared with the prior technology, the present device adds the degree of freedom of Z-axis and the spectrum confocal displacement sensor as well as the corresponding control flow. The device can thus quickly achieve high-precision tool aligning function and reduce the operation requirements.

Those skilled in this field will readily observe that numerous modifications and alterations of the device and method may be made without departing from the spirit and scope of the invention as defined by the appended claims.

What is claimed is:
1. An automatic tool aligning system based on a spectral confocal displacement sensor comprising a three-dimensional moving platform, a tool aligning component based on the spectral confocal displacement sensor, a clamping device, a machine tool and a control module, the three-dimensional moving platform is fixedly arranged on an outer side of the machine tool, the tool aligning component based on spectral confocal displacement sensor is connected with the three-dimensional moving platform, the clamping device is arranged between a fixed tip and a moving tip of the machine tool through a mechanical connection, the spectrum confocal displacement sensor is connected with the control module, and the control module outputs a control instruction to the three-dimensional moving platform after judging a collected working condition data; wherein a workpiece clamping device comprises the fixed tip of the machine tool, the moving tip of the machine tool, a rotary limiting block, a clamping ring and a workpiece, the rotary limiting block is fixedly arranged on the machine tool through screws and the workpiece is fixedly arranged between the fixed tip and the moving tip of the machine tool, the clamping ring is clamped on the workpiece through a screw and a handle of the clamping ring is in contact with the rotating limit block, when the machine tool rotates, the rotary limiting block drives the clamping ring to rotate, and then drives the workpiece to rotate.

2. The automatic tool aligning system based on the spectral confocal displacement sensor of claim 1, characterized in that, the three-dimensional mobile platform comprises three moving modules which is perpendicular to each other, a base of X-axis motion module is fixedly arranged on the outer side of the machine tool, a X-axis motion module is connected with the base of X-axis motion module, a base of Y-axis motion module is connected with the X-axis motion module, a Y-axis motion module is connected with the base of the Y-axis motion module, a base of Z-axis motion module is fixedly arranged on the Y-axis motion module through a first adapter plate.

3. The automatic tool aligning system based on the spectral confocal displacement sensor of claim 2, characterized in that, the tool aligning component based on the spectral confocal displacement sensor comprises a diamond turning tool, the spectral confocal displacement sensor, fixed cover of the spectral confocal displacement sensor, a supporting seat of the spectral confocal displacement sensor and the turning tool, a second adapter plate is connected with the Z-axis moving module, the diamond turning tool is connected with the supporting seat of the spectral confocal displacement sensor and the turning tool, the spectral confocal displacement sensor is clamped and fixed through the fixed cover of the spectral confocal displacement sensor and the supporting seat of the spectral confocal displacement sensor and the turning tool.

4. The automatic tool aligning system based on the spectral confocal displacement sensor of claim 1, characterized in that, an axis of the spectral confocal displacement sensor is in the same plane with a diamond cutting edge, and an error range is within 0. 1 mm.

5. The automatic tool aligning system based on the spectral confocal displacement sensor of claim 1, characterized in that, the control module comprises a displacement data reading unit, a state decision unit and a motion execution unit, the displacement data reading unit is connected with the state decision unit, a position data read from the spectral confocal displacement sensor is transmitted to the state decision unit, the state decision unit is connected with the motion execution unit, and an acquired pose information is judged and sent to the three-dimensional moving platform.

* * * * *